US012311853B2

(12) United States Patent
Mizuno et al.

(10) Patent No.: US 12,311,853 B2
(45) Date of Patent: May 27, 2025

(54) DOOR WIRING MODULE AND ASSEMBLING STRUCTURE OF DOOR WIRING MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Osaka (JP); Koji Yamaguchi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 367 days.

(21) Appl. No.: 18/015,443

(22) PCT Filed: Jul. 13, 2021

(86) PCT No.: PCT/JP2021/026207
§ 371 (c)(1),
(2) Date: Jan. 10, 2023

(87) PCT Pub. No.: WO2022/024741
PCT Pub. Date: Feb. 3, 2022

(65) Prior Publication Data
US 2023/0356676 A1 Nov. 9, 2023

(30) Foreign Application Priority Data

Jul. 31, 2020 (JP) .................................. 2020-130958

(51) Int. Cl.
*B60R 16/027* (2006.01)
*B60J 5/04* (2006.01)
*B60R 16/02* (2006.01)

(52) U.S. Cl.
CPC .......... *B60R 16/027* (2013.01); *B60J 5/0413* (2013.01); *B60R 16/0222* (2013.01)

(58) Field of Classification Search
CPC ... B60R 16/027; B60R 16/02; B60R 16/0215; B60R 16/0222; H02G 3/04; H02G 3/30; B60J 5/0413
See application file for complete search history.

(56) References Cited

U.S. PATENT DOCUMENTS

| | | | | |
|---|---|---|---|---|
| 5,735,041 A | * | 4/1998 | Zaguskin | ............ B60R 16/0215 29/857 |
| 5,994,645 A | * | 11/1999 | Suzuki | ................ B60R 16/0215 174/72 A |

(Continued)

FOREIGN PATENT DOCUMENTS

| | | |
|---|---|---|
| JP | 2010-132242 | 6/2010 |
| JP | 2015-65710 | 4/2015 |

(Continued)

OTHER PUBLICATIONS

International Search Report issued in International Patent Application No. PCT/JP2021/026207, dated Oct. 5, 2021, along with an English translation thereof.

*Primary Examiner* — Paresh Paghadal
(74) *Attorney, Agent, or Firm* — GREENBLUM & BERNSTEIN, P.L.C.

(57) ABSTRACT

A door wiring module includes a plurality of wiring members and an inner side route regulation member and an outer side route regulation member regulating routes of the plurality of wiring members. The plurality of wiring members include: an outer side regulation route portion disposed (Continued)

between the outer panel and the inner panel so that a route of the outer side regulation route portion is regulated by the outer side route regulation member; an inner side regulation route portion disposed closer to an inner side of a vehicle interior than the outer side regulation route portion so that a route of the inner side regulation route portion is regulated by the inner side route regulation member; and a connection route portion between the inner side regulation route portion and the outer side regulation route portion. The connection route portion includes an easy-bending part bended more easily than the outer side regulation route portion.

11 Claims, 8 Drawing Sheets

(56) References Cited

U.S. PATENT DOCUMENTS

| | | | | |
|---|---|---|---|---|
| 6,036,501 | A | * | 3/2000 | Wojewnik ............ B60R 16/0207 |
| | | | | 439/931 |
| 6,079,461 | A | * | 6/2000 | Fisher .................... B65G 53/06 |
| | | | | 406/122 |
| 2022/0017026 | A1 | | 1/2022 | Yamaguchi et al. |

FOREIGN PATENT DOCUMENTS

| | | |
|---|---|---|
| JP | 2017-139928 | 8/2017 |
| JP | 2020-83075 | 6/2020 |

* cited by examiner

DOOR WIRING MODULE AND ASSEMBLING STRUCTURE OF DOOR WIRING MODULE

TECHNICAL FIELD

The present disclosure relates to a door wiring module and an assembling structure of a door wiring module.

BACKGROUND ART

Patent Document 1 discloses a door wiring module for connecting an apparatus disposed in a door of a vehicle and an apparatus in a body.

PRIOR ART DOCUMENTS

Patent Document(s)

Patent Document 1: Japanese Patent Application Laid-Open No. 2020-83075

SUMMARY

Problem to be Solved by the Invention

When a plurality of wiring members are modularized, it is considered that an outer side regulation route portion passing through a route closer to an outer side of a vehicle interior than an inner panel of a door and an inner side regulation route portion passing through a route closer to an inner side of the vehicle interior are modularized. When this wiring module is assembled to a door panel, the outer side regulation route portion needs to be assembled through a service hole formed in an inner panel while the inner side regulation route portion is located closer to the inner side of the vehicle interior than the inner panel, and improvement of assemblability is desired.

Accordingly, it is an object to provide a technique capable of improving assemblability of a door wiring module including an outer side regulation route portion and an inner side regulation route portion.

Means to Solve the Problem

A door wiring module according to the present disclosure is a door wiring module assembled to a vehicle door panel including an outer panel and an inner panel, including: a plurality of wiring members connecting a vehicle body apparatus and a door apparatus; and an inner side route regulation member and at least one outer side route regulation member regulating routes of the plurality of wiring members, wherein the plurality of wiring members include: an outer side regulation route portion disposed between the outer panel and the inner panel so that a route of the outer side regulation route portion is regulated by the outer side route regulation member; an inner side regulation route portion disposed closer to an inner side of a vehicle interior than the outer side regulation route portion so that a route of the inner side regulation route portion is regulated by the inner side route regulation member; and a connection route portion as a portion connecting a portion between the inner side regulation route portion and the outer side regulation route portion, and the connection route portion includes an easy-bending part bended more easily than the outer side regulation route portion.

Effects of the Invention

According to the present disclosure, assemblability of the door wiring module including the outer side regulation route portion and the inner side regulation route portion can be improved.

DESCRIPTION OF EMBODIMENT(S)

Description of Embodiment of Present Disclosure

Figure 1:
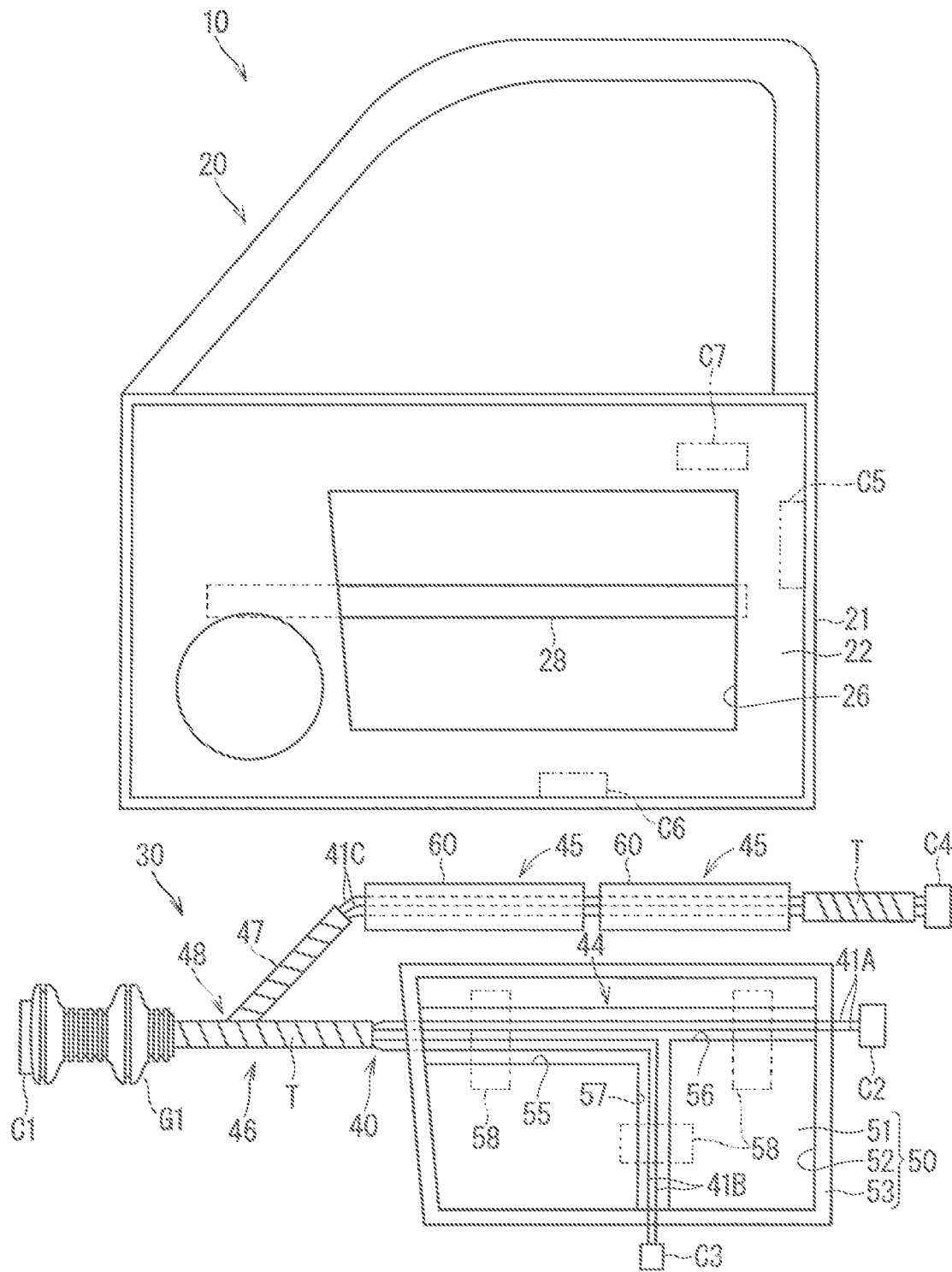
FIG. 1 is a front view illustrating a door wiring module according to an embodiment 1 and a door panel to which the door wiring module is assembled.

Embodiments of the present disclosure are listed and described firstly.

A door wiring module according to the present disclosure is as follows.

(1) A door wiring module is a door wiring module assembled to a vehicle door panel including an outer panel and an inner panel, including: a plurality of wiring members connecting a vehicle body apparatus and a door apparatus; and an inner side route regulation member and at least one outer side route regulation member regulating routes of the plurality of wiring members, wherein the plurality of wiring members include: an outer side regulation route portion disposed between the outer panel and the inner panel so that a route of the outer side regulation route portion is regulated by the outer side route regulation member; an inner side regulation route portion disposed closer to an inner side of a vehicle interior than the outer side regulation route portion so that a route of the inner side regulation route portion is regulated by the inner side route regulation member; and a connection route portion as a portion connecting a portion between the inner side regulation route portion and the outer side regulation route portion, and the connection route portion includes an easy-bending part bended more easily than the outer side regulation route portion. The routes of the inner side regulation route portion and the outer side regulation route portion can be regulated by the route regulation members, respectively. The easy-bending part is provided to the connection route portion, thus the inner side regulation route portion and the outer side regulation route portion can be easily disposed in predetermined assembling positions. Accordingly, assemblability of the door wiring module including the outer side regulation route portion and the inner side regulation route portion can be improved.

(2) In the door wiring module according to (1), it is also applicable that a branch part is provided to a side of an end portion of the connection route portion connected to the vehicle body apparatus, a window housing part housing a window glass in a closed state is provided between the outer panel and the inner panel, and the outer side regulation route portion extends between the window housing part and the outer panel. When the branch part is provided to the side of the end portion connected to the vehicle body apparatus, the outer side regulation route portion is assumed to be long. Even in this case, assemblability of the outer side regulation route portion can be improved.

(3) In the door wiring module according to (2), the plurality of outer side route regulation members may be provided at intervals in a longitudinal direction of the wiring member. Accordingly, the door wiring module can be folded at a position between the outer side route regulation members, thus even when the outer side regulation route portion is long, a transportation state of the door wiring module can be downsized.

(4) In the door wiring module according to (1), a wiring member constituting the outer side regulation route portion may constitute the connection route portion and the inner side regulation route portion in a midway portion from the outer side regulation route portion toward a side of a vehicle body. Accordingly, the route of a part of a section can be regulated by the inner side route regulation member in the wiring member constituting the outer side regulation route portion.

(5) In the door wiring module according to (4), it is also applicable that a window housing part housing a window glass in an open state is provided between the outer panel and the inner panel, and the wiring member constituting the outer side regulation route portion wraps around the window housing part from a back side of the vehicle door panel in at least one of the connection route portion and/or the outer side regulation route portion. Accordingly, the route of the wiring member wrapping around the window housing part from the back side of the door panel can be regulated by the outer side route regulation member.

(6) In the door wiring module according to any one of (1) to (5), it is also applicable that the outer side route regulation member is a sheet, and the plurality of wiring members constituting the outer side regulation route portion are held to be arranged side by side on the sheet. Accordingly, the outer side regulation route portion can be kept flat, thus the outer side regulation route portion can be assembled to a narrow space in the door.

(7) In the door wiring module according to (6), it is also applicable that the sheet includes a first sheet and a second sheet having higher rigidity than the first sheet, and the wiring member is fixed to the first sheet by a contact area direct fixation. Accordingly, the wiring member can be fixed to the sheet by the contact area direct fixation while the route of the outer side regulation route portion is regulated by the sheet.

(8) In the door wiring module according to (7), the wiring member may be sandwiched between the first sheet and the second sheet. Accordingly, both sides of the wiring member can be protected by the sheet.

(9) In the wiring module according to any one of (6) to (8), an adhesive layer may be provided to the sheet. Accordingly, the sheet is bonded to the door panel via the adhesive layer, and the outer side regulation route portion can be fixed to the door panel.

(10) In the door wiring module according to any one of (1) to (9), the inner side route regulation member may be a service hole cover covering a service hole formed in the inner panel. Accordingly, the service hole cover and the inner side regulation route portion can be assembled together, and assemblability of the inner side regulation route portion can be improved.

(11) An assembling structure of a door wiring module according to the present disclosure is an assembling structure of a door wiring module including: the door wiring module according to any one of (1) to (10), and a door panel to which the door wiring module is assembled.

DETAILS OF EMBODIMENT OF PRESENT DISCLOSURE

Specific examples of a door wiring module and an assembling structure thereof according to the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
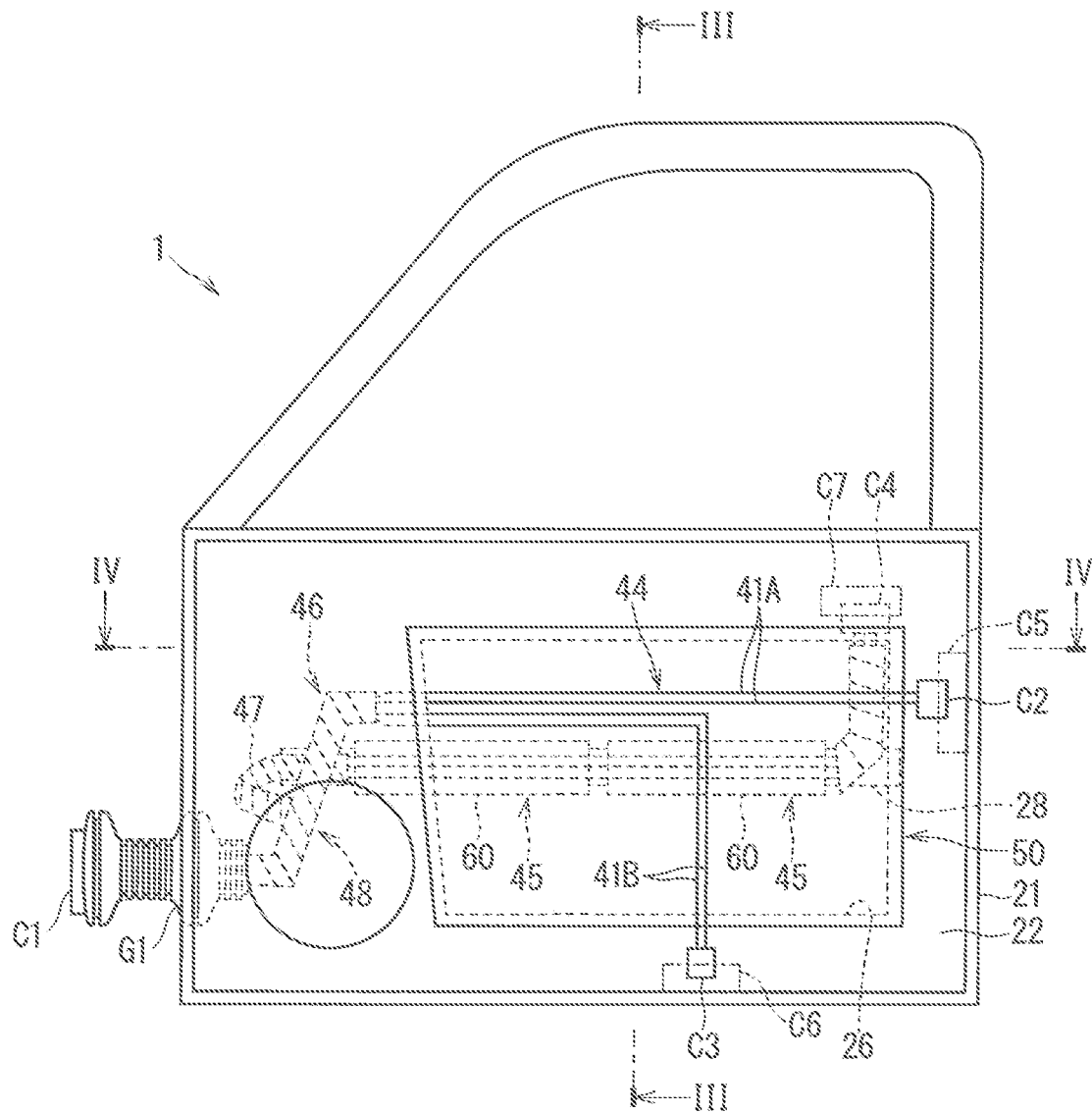
FIG. 2 is a front view illustrating an assembling structure of a door wiring module according to the embodiment 1.
Figure 3:
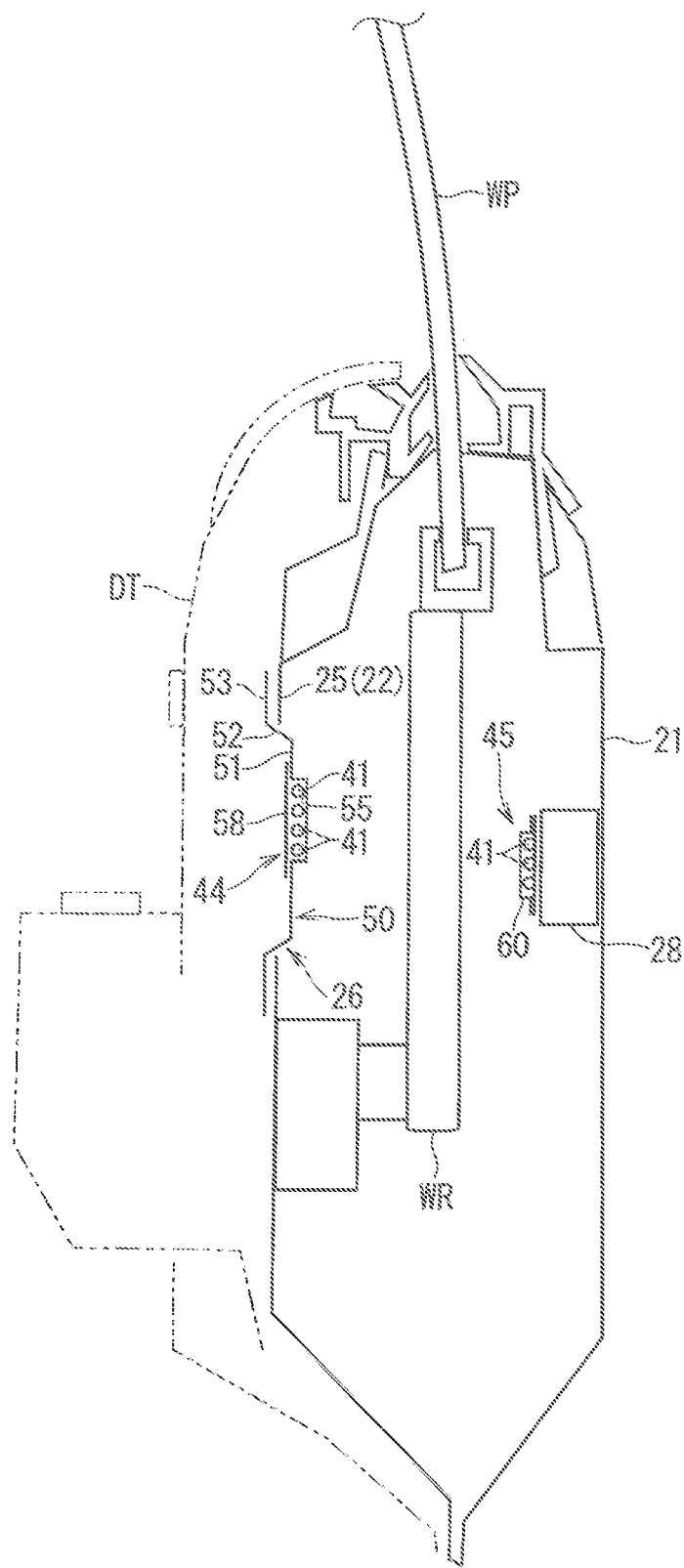
FIG. 3 is a schematic diagram of the assembling structure of the door wiring module cut along a III-III line in FIG. 2.
Figure 4:
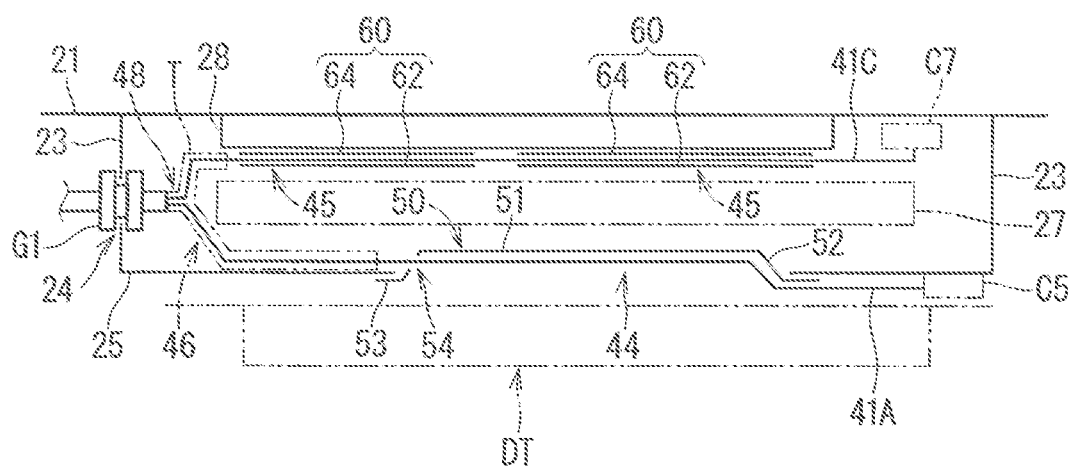
FIG. 4 is a schematic diagram of the assembling structure of the door wiring module cut along a IV-IV line in FIG. 2.

A door wiring module and an assembling structure thereof according to an embodiment 1 are described hereinafter. FIG. 1 is a front view illustrating a door wiring module 30 according to the embodiment 1 and a door panel 20 to which the door wiring module is assembled. FIG. 2 is a front view illustrating an assembling structure 1 of the door wiring module according to the embodiment 1. FIG. 3 is a schematic diagram of the assembling structure 1 of the door wiring module cut along a III-III line in FIG. 2. FIG. 4 is a schematic diagram of the assembling structure 1 of the door wiring module cut along a IV-IV line in FIG. 2.

Firstly, an outline of a door 10 in a vehicle is described. The door 10 is formed into a flat shape as a whole, and is a part openable and closable to partition an inner side and outer side of a vehicle. The door 10 is assumed to be a driver side door, a passenger's side door, and a rear seat door, for example. The door 10 includes the door panel 20, a design trim DT, and the door wiring module 30.

The door panel 20 includes an outer panel 21 and an inner panel 22. The outer panel 21 is provided to a portion of the door 10 facing an outer side of the vehicle to constitute an appearance of the vehicle together with a body part. The inner panel 22 is provided to a vehicle interior side of the outer panel 21. The inner panel 22 includes a side plate part 23 and a main plate part 25. The side plate part 23 is a portion protruding from the outer panel 21 to the inner side of the vehicle. The main plate part 25 is a portion communicated with the side plate part 23, and extends along the outer panel 21 with a distance from the outer panel 21. A space is formed between the outer panel 21, the main plate part 25, and the side plate part 23. A door apparatus provided to the door 10 is disposed and a window glass WP is housed in the space. A service hole 26 is provided to the main plate part 25 of the inner panel 22. An operator can have access to the space between the outer panel 21 and the inner panel 22 via the service hole 26 from an outer side of the inner panel 22.

The design trim DT is a portion provided to a portion of the door 10 facing the inner side of the vehicle to constitute the interior of the vehicle. An inner handle and an operation part of an in-vehicle apparatus, for example, are attached to the design trim DT; for example.

The door wiring module 30 includes a wiring member 40, an inner side route regulation member 50, and an outer side route regulation member 60.

The wiring member 40 connects the door apparatus and a vehicle body apparatus provided to a vehicle body to supply electrical power to the door apparatus or transmit a signal between the door apparatus and the vehicle body apparatus. The wiring member 40 may include an electrical wire 41. A covering wire having a core wire 42 made up of a conductor with a covering layer 43 around the core wire 42 can be used as the electrical wire 41 (refer to FIG. 5). The core wire 42 may be a single core wire or a stranded wire. A type of the electrical wire 41 is not particularly limited, but can include a single wire or a composite wire. The single wire is an electrical wire having one conductive route. The composite wire is an electrical wire having a plurality of conductive routes. Applicable as the composite wire is a twisted wire or a composite cable, for example, formed of a plurality of single wires combined with each other. The wiring member 40 may include an optical fiber cable, for example.

The plurality of wiring members 40 are provided. Routes of the plurality of wiring member 40 are appropriately set in accordance with a specification of the door 10. For example, in a case of a general hinge door having a rotational axis extending along a height direction of a vehicle, the plurality of wiring members 40 assembled to the hinge door is normally connected to a vehicle body at a position near a door hinge, and are branched at a time of being directed from a side of the door hinge toward a side opposite to the door hinge to be connected to various types of door apparatus.

More specifically, it is assumed that one end portions of the plurality of wiring members 40 go through a part of the door (the side plate part 23 on the side of the door hinge in the example illustrated in FIG. 1) to extend from the door 10 in a bundled state, and are led inside the vehicle body to be connected to the vehicle body apparatus via a common connector C1, for example, or a relay connector provided to an end portion of a wiring member extending from the vehicle body apparatus. The vehicle body apparatus is not particularly limited, but is assumed to be an electric control unit (ECU) or a battery, for example. A grommet G1 is normally attached to a portion of the plurality of wiring members 40 extending between the door 10 and the vehicle body. In the example illustrated in FIG. 1, the grommet G1 is a so-called feed-through grommet inserted and locked to a through hole 24 formed in the side plate part 23. Accordingly, ingress of water through the through hole 24 is suppressed. The plurality of wiring members 40 extend from the grommet G1 in a midway portion from one end portion to the other portion, and are branched and extend toward the door apparatus as connection destinations, respectively. Connectors C2, C3, and C4 corresponding to the door apparatuses as the connection destinations, respectively, are attached to the other end portions of the plurality of wiring members 40. The connectors C2, C3, and C4 are connected to connectors C5, C6, and C7 on sides of the door apparatuses, respectively, for example. FIG. 1 and FIG. 2 exemplify the connectors C5, C6, and C7 on the sides of three door apparatuses and electrical wires 41A, 41B, and 41C connected to the connectors C5, C6, and C7 via the connectors C2, C3, and C4, respectively.

The connector C5 is a connector for an actuator for locking and unlocking the door 10, for example. The connector C6 is a connector for a foot light, for example. The connector C7 is a connector for a door apparatus provided to an outer handle, for example. Assumed as the door apparatus provided to the outer handle is one or some of a sensor detecting an opening and closing operation of a key, a sensor detecting an operation of the outer handle, an antenna device performing at least one of transmission and/or reception of a signal to and/from a key-side antenna device, and a switch provided to the outer handle, for example.

Omitted in FIG. 1 and FIG. 2 is an illustration of a connector and a wiring member other than the connectors C5, C6, and C7 on the sides of three door apparatuses and the electrical wires 41A, 41B, and 41C connected thereto, respectively. Needless to say, the door wiring module 30 may include a wiring member other than the electrical wires 41A, 41B, and 41C connected to the connectors C25, C6, and C7 on the sides of three door apparatuses, respectively.

The plurality of wiring members 40 are modularized to include an inner side regulation route portion 44, an outer side regulation route portion 45, and a connection route portion 46. Each of the inner side regulation route portion 44, the outer side regulation route portion 45, and the connection route portion 46 normally includes the plurality or electrical wires 41.

The inner side regulation route portion 44 is a portion disposed closer to the inner side of the vehicle than the inner panel 22. The inner side regulation route portion 44 is a portion where a route of the inner side regulation route portion 44 is regulated by the inner side route regulation member 50. In the example illustrated in FIG. 1, the inner side regulation route portion 44 is a part of a route of the electrical wire 41A connected to an actuator for locking and unlocking the door and the electrical wire 41B connected to the foot light. In addition, the inner side regulation route portion 44 may be a part of a route of a wiring member for a switch exposed to the vehicle interior or a wiring member for an actuator of a mirror of the door 10, for example. The state where the route of the wiring member 40 is regulated indicates that the route of the wiring member 40 is maintained in a predetermined route.

The outer side regulation route portion 45 is a portion disposed between the outer panel 21 and the inner panel 22. The outer side regulation route portion 45 is a portion where a route of the outer side regulation route portion 45 is regulated by the outer side route regulation member 60. In the example illustrated in FIG. 1, the outer side regulation route portion 45 is a part of a route of the electrical wire 41C for the outer handle. In addition, the outer side regulation route portion 45 may be a part of a route of a wiring member for a speaker or a wiring member for an actuator of a window regulator WR, for example.

The connection route portion 46 is a portion connecting the inner side regulation route portion 44 and the outer side regulation route portion 45. The connection route portion 46 includes an easy-bending part 47. The easy-bending part 47 is a portion of the outer side regulation route portion 45 bended more easily than a portion thereof provided with the outer side route regulation member 60. For example, the wiring member 40 as a single body is a member easily bended in any direction in a radial direction. The outer side route regulation member 60 is hardly bended in at least one direction in the radial direction of the wiring member 40. The easy-bending part 47 can be preferably bended in any direction of the radial direction. The easy-bending part 47 has more directions in which the easy-bending part 47 can be bended in the radial direction than the outer side regulation route portion 45. The easy-bending part 47 may be wholly provided with a member uniformly having low rigidity such as an adhesive tape, a flexible sheet, or a rubber member. The easy-bending part 47 may be provided with a member having a shape locally bended easily such as an accordion part of a corrugate tube. For example, the easy-bending part 47 may be provided to a bundled wire portion made up of the plurality of wiring members 40 bundled by a banding member. In this case, it is sufficient that the banding member bundles the plurality of wiring members 40 in a state where the plurality of wiring members 40 can be bended.

The banding member may be a banding band, for example. A dimension along a longitudinal direction of the wiring member 40 in a dimension of the banding band is short (shorter than a dimension along a width direction of the wiring member 40, for example). A portion where the banding banded is provided along the longitudinal direction of the wiring member 40 is deemed to be locally provided, thus the banding band bundles the plurality of wiring members 40 in the state where the plurality of wiring members 40 can be bended. For example, the banding member may be a member having a plastic property so as to be able to follow bending of the wiring member 40 even when it is wound around the wiring member 40 such as an adhesive tape T, a flexible sheet, or a corrugate tube. In this case, a dimension along the longitudinal direction of the wiring member 40 in a dimension of a portion provided with the banding member having the plastic property may be longer than a dimension along the width direction of the wiring member 40. In the example illustrated in FIG. 1, the plurality of wiring members 40 are banded by the adhesive tape T spirally wound.

Herein, a branch part 48 is provided to the connection route portion 46. The grommet G1 is provided between the branch part 48 and the connector C1. When a flow of the plurality of wiring members 40 from the vehicle body toward the door 10 is observed, the plurality of wiring members 40 are branched into the electrical wires 41A and 41B constituting the inner side regulation route portion 44 and the electrical wire 41C constituting the outer side regulation route portion 45 in the branch part 48 after extending from the grommet G1. When a flow of the plurality of wiring members 40 from the door 10 toward the vehicle body is observed, the electrical wires 41A and 41B constituting the inner side regulation route portion 44 and the electrical wire 41C constituting the outer side regulation route portion 45 are joined together in the branch part 48 and extend toward the grommet G1. Herein, a portion of the connection route portion 46 closer to a side of the door 10 than a portion thereof provided with the grommet G is disposed in a space between the outer panel 21 and the inner panel 22 in the manner similar to the outer side regulation route portion 45.

It is sufficient that the easy-bending part 47 is provided between at least the outer side regulation route portion 45 and the branch part 48 in the connection route portion 46. In the example illustrated in FIG. 1, a portion between the grommet G1 and the branch part 48, a portion between the inner side regulation route portion 44 and the branch part 48, and a portion between the outer side regulation route portion 45 and the branch part 48 in the connection route portion 46 wholly constitute the easy-bending part 47. Accordingly, in the example illustrated in FIG. 1, a whole region of the connection route portion 46 between the inner side regulation route portion 44 and the outer side regulation route portion 45 constitutes the easy-bending part 47.

The electrical wires 41A and 41B constituting the inner side regulation route portion 44 pass through the inner panel 22 in a midway portion from a portion provided with the grommet C1 toward the connectors C2 and C3 and are located closer to a side of the vehicle interior than the inner panel 22. The electrical wires 41A and 41B are divided into the inner side regulation route portion 44 and the connection route portion 46 from a portion thereof passing through the inner panel 22. A portion of the electrical wires 41A and 41B closer to the side of the door apparatus in relation to the portion thereof passing through the inner panel 22 constitutes the inner side regulation route portion 44 and a portion thereof closer to the side of the vehicle body apparatus constitutes the connection route portion 46. Herein, the electrical wires 41A and 41B pass through the service hole 26 to be located closer to the inner side of the vehicle than the inner panel 22. The electrical wires 41A and 41B may pass through a hole other than the service hole 26 to be located closer to the inner side of the vehicle than the inner panel 22.

The electrical wire 41C constituting the outer side regulation route portion 45 is disposed in the space between the outer panel 21 and the inner panel 22 over the whole area thereof extending from the grommet G1 to the connector C4. The window housing part 27 is provided between the outer panel 21 and the inner panel 22. The window housing part 27 is a portion housing the window glass WP in an open state. The open state indicates that the window glass WP is moved downward at a maximum level, and a whole area of the window glass WP needs not be necessarily housed in the window housing part 27. The window housing part 27 is a gap formed between the outer panel 21 and the inner panel 22. A portion of the electrical wire 41C constituting the easy-bending part 47 wraps around the window housing part 27 from a front side of the door 10, and a portion thereof constituting the outer side regulation route portion 45 extends between the window housing part 27 and the outer panel 21.

The inner side route regulation member 50 is a member regulating the route of the inner side regulation route portion 44. The inner side route regulation member 50 may be a planar member or a protector, for example. It is sufficient that the planar member is disposed to extend along a front-back direction and a height direction of the vehicle in the manner similar to the inner panel 22. Such a planar member may be a service hole cover 50 or a sound-proof sheet, for example. In the description hereinafter, the inner side route regulation member 50 is the service hole cover 50. It is sufficient that the inner side route regulation member 50 is a member having rigidity of hardly bended. When the inner side route regulation member 50 is the planar member, it is sufficient that the inner side route regulation member 50 is hardly bended around an axis along a direction perpendicular to a main surface thereof, and also applicable is a member having a plastic property of being easily bended around an axis along a direction parallel to a plane.

The service hole cover 50 covers the service hole 26. The service hole cover 50 is a flat resin component extending to a range approximately equal to or wider than the service hole 26. The service hole cover 50 is attached to cover the service hole 26. Accordingly, the service hole cover 50 can partition the inner side and outer side of the vehicle. An attachment state where the service hole cover 50 is attached to the service hole 26 of the inner panel 22 is held by screwing, a locking structure, or adhesion, for example. For example, when a peripheral part of the service hole cover 50 overlapped with the inner panel 22 is bonded to the inner panel 22, a gap therebetween can be practicably covered.

The service hole cover 50 partitions the inner side of the vehicle of the space between the outer panel 21 and the inner panel 22. The window glass WP exposed to a rainwater environment is housed in the space, and a slit-like opening through which the window glass WP goes in and out is formed on an upper side of the space. Thus, the space is a space which water may enter. The space is a space which may be connected to an outer space, thus is also a space which a wind noise, for example, may enter from outside. Thus, it is sufficient that the service hole cover 50 is provided as a member for completely partitioning a vehicle interior space and an outer space with the inner panel 22. More specifically, the service hole cover 50 includes a cover body part 51, a frame part 52, and a flange part 53. Herein, the service hole cover 50 is a component made up of molded resin such as polypropylene (PP), and has rigidity of hardly bended. The service hole cover 50 may be a water-proof film, for example.

The cover body part 51 is a portion planarly extend to a range slightly smaller than the service hole 26. The frame part 52 is formed to protrude to a side of one main surface (inner side of the vehicle) of the cover body part 51 from an outer edge of the cover body part 51. The flange part 53 is formed to protrude to a side of an outer periphery from an outer edge of the frame part 52. The frame part 52 is formed to have an inclined surface with a gradually decreasing height dimension from the flange part 53 toward the cover body part 51. The cover body part 51 is disposed on an inner side of the service hole 26 (closer to a side of the outer panel 21 than the main plate part 25) while the service hole cover 50 is attached to a predetermined position of the service hole 26 of the inner panel 22, the flange part 53 is disposed closer to an outer side of the service hole 26 (closer to the inner side of the vehicle than the main plate part 25), and the frame part 52 connects the cover body part 51 and the flange part 53. Accordingly, the frame part 52 and the flange part 53 cover a portion between an opening edge portion of the cover body part 51 and a peripheral edge portion of the service hole 26.

An insertion hole 54 through which the wiring member 40 passes is formed in the service hole cover 50. The electrical wires 41A and 41B pass through the service hole cover 50 and the inner panel 22 through the insertion hole 54 and the service hole 26. It is sufficient that the insertion hole 54 is formed in the cover body part 51 or the frame part 52 in the service hole cover 50. Herein, the insertion hole 54 is formed in the frame part 52. Particularly, the insertion hole 54 is formed in a position of an end portion of a groove 55 described hereinafter in the frame part 52 herein. Accordingly, the wiring member 40 housed in the groove 55 can pass through the service hole cover 50 through the through the through hole 54.

A fixing state of the wiring member 40 to the service hole cover 50 is not particularly limited, however, a contact area fixation or a non-contact area fixation, for example, may be adopted.

Herein, the contact area fixation indicates that a portion where the wiring member 40 and a fixation target have contact with each other is stuck and is not separated, thus the wiring member 40 and the fixation target is kept in a fixed state. Applicable as the state of the contact area fixation are a contact area indirect fixation and a contact area direct fixation. The contact area indirect fixation indicates that the wiring member 40 and the fixation target are indirectly stuck and fixed via an intervening member such as an adhesive agent, a gluing agent, and a double-sided adhesive tape provided therebetween. The contact area direct fixation indicates that the wiring member 40 and the fixation target are directly stuck and fixed without an intervention of the adhesive agent, for example, which is separately provided. Assumed in the contact area direct fixation is that resin included in at least one of the wiring member 40 and the fixation target is melted, thus the wiring member 40 and the fixation target are stuck and fixed, for example.

The non-contact area fixation indicates the fixing state which is not the contact area fixation. For example, a sewing thread, the other sheet material, or an adhesive tape presses the wiring member 40 toward the fixation target, or a sewing thread, the other sheet material, or an adhesive tape surrounds the wiring member 40 and the fixation target, thereby sandwiching the wiring member 40 and the fixation target to keep the wiring member 40 and the fixation target fixed to each other.

The non-contact area fixation is adopted as the fixing state of the wiring member 40 to the service hole cover 50 herein. Grooves 55, 56, and 57 formed in the service hole cover 50 are used herein to fix the wiring member 40 to the service hole cover 50 by the non-contact area fixation. The grooves 55, 56, and 57 are formed in one main surface of the cover body part 51. A wiring cover 58 covers an upper side of the grooves 55, 56, and 57 while at least a part of the wiring member 40 constituting the inner side regulation route portion 44 in an extension direction thereof is housed in the grooves 55, 56, and 57 to prevent the wiring member 40 from coming out of the grooves 55, 56, and 57. In FIG. 2, the grooves 55, 56, and 57 and the wiring cover 58 are omitted.

More specifically, the grooves 55, 56, and 57 are formed along the route of the inner side regulation route portion 44 in the service hole cover 50. The groove 55 is formed along a front-back direction of the vehicle from a front portion to a rear portion of the service hole cover 50. When the service hole cover 50 is observed from the vehicle interior side, the groove 55 is formed straight to extend along the front-back direction of the vehicle. The grooves 56 and 57 are branched from the end portion of the groove 55. The groove 56 is formed straight to extend along the front-back direction of the vehicle. The groove 57 is formed straight to extend along a height direction of the vehicle.

The electrical wires 41A and 41B constituting the inner side regulation route portion 44 are branched into two branch wire parts from one main wire part in the branch part 48 on the service hole cover 50. The main wire part is a portion where the electrical wires 41A and 41B are parallelly arranged. Two branch wire parts are portions where the electrical wires 41A and 41B extend independently. The main wire part is housed in the groove 55, and two branch wire parts are housed in the grooves 56 and 57, respectively. The grooves 55 and 56 can be used to hold the electrical wire 41A connected to the door apparatus incorporated into a rear portion of the door 10 such as an actuator for locking and unlocking the door, for example. The grooves 55 and 57 can be used to hold the electrical wire 41B connected to the door apparatus incorporated into a lower portion of the door 10 such as a foot light, for example.

Each of the grooves 55, 56, and 57 are formed to have a size capable of collectively housing the plurality of wiring members 40. Each of the grooves 55, 56, and 57 is flatly formed so that a width dimension thereof is larger than a depth dimension thereof. A plurality of grooves each having a size capable of separately housing the plurality of electrical wires may be formed in parallel to each other as the grooves 55, 56, and 57. For example, a plurality of grooves each having a size to house one electrical wire may be formed in parallel to each other.

The wiring cover 58 may be formed into a plate-like shape to be disposed to extend across the grooves 55, 56, and 57 on the upper portion of the grooves 55, 56, and 57, for example. The wiring cover 58 may be fixed to the service hole cover 50 at a position of a side edge portion of the grooves 55, 56, and 57 by adhesion or fusion, for example.

Figure 5:
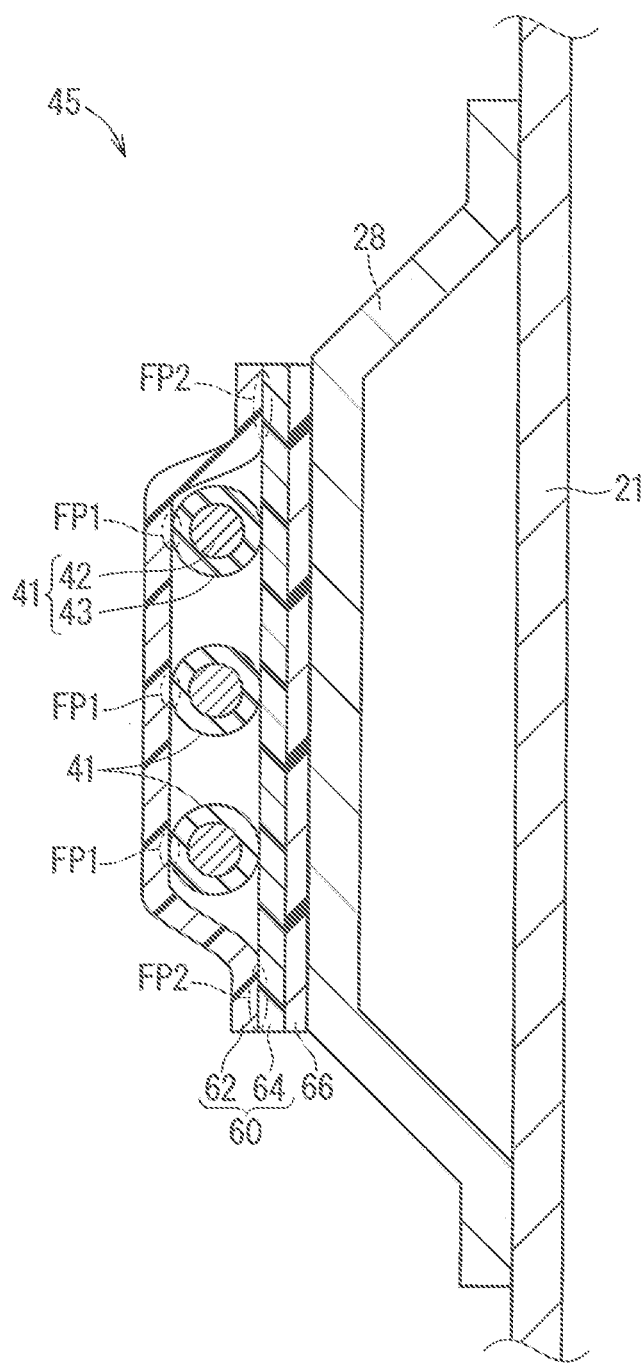
FIG. 5 is a transverse-sectional view illustrating an outer side regulation route portion.

The outer side route regulation member 60 is a member regulating the route of the outer side regulation route portion 45. The outer side regulation route portion 45 provided with the outer side route regulation member 60 is described with reference to FIG. 5 in addition to FIG. 1 to FIG. 4. FIG. 5 is a transverse-sectional view illustrating the outer side regulation route portion 45.

In the description herein, the outer side route regulation member 60 is the sheet 60. The plurality of wiring members 40 are held in a state of being arranged side by side on the sheet 60. Particularly herein, the plurality of wiring members 40 are held in a state of being arranged in a line on the sheet 60. The plurality of wiring members 40 are disposed straight on the sheet 60. The sheet 60 includes a first sheet 62 and a second sheet 64. The wiring member 40 are sandwiched between the first sheet 62 and the second sheet 64.

A fixing state of the wiring member 40 to the sheet 60 is not particularly limited, however, a contact area fixation or a non-contact area fixation, for example, may be adopted in the manner similar to the fixing state of the wiring member 40 to the service hole cover 50. The contact area fixation is adopted as the fixing state of the wiring member 40 to the sheet 60 herein.

The wiring member 40 is fixed to only the first sheet 62 in the first sheet 62 and the second sheet 64 by a contact area fixation. The wiring member 40 and the second sheet 64 are not fixed to each other by the contact area fixation. The second sheet 64 is fixed to the first sheet 62. Accordingly, the second sheet 64 is fixed to the wiring member 40 via the first sheet 62. A fixing state of the first sheet 62 and the second sheet 64 is not particularly limited, however, the contact area fixation or the non-contact area fixation may also be applicable. The fixing state of the first sheet 62 and the second sheet 64 may be the same as or different from that of the wiring member 40 and the first sheet 62.

The wiring member 40 and the first sheet 62 are fixed to each other by the contact area direct fixation. In the case, only the resin included in the covering layer 43 of the wiring member 40 may be melted, or only the resin included in the first sheet 62 may be melted. In these cases, the resin which has been melted is stuck on an outer surface of the resin on the other side, and a relatively clear interface may be formed in some cases. Both the resin included in the covering layer 43 of the wiring member 40 and the resin included in the first sheet 62 may be melted. In this case, there may be a case where both the resins are mixed and a clear interface is not formed. The resin included in the covering layer 43 of the wiring member 40 and the resin included in the first sheet 62 may be formed of materials such as the same type of resin material so that they can be fixed by the contact area direct fixation. For example, both the covering layer 43 of the wiring member 40 and the first sheet 62 may be made of polyvinyl chloride (PVC) or polyethylene (PE), for example.

At this time, a means of forming the state of the contact area direct fixation is not particularly limited, but a known means such as fusion can be used. Adoptable are various types of fusion means such as ultrasonic fusion, heating pressurizing fusion, hot air fusion, and high-frequency fusion in the case of fusion. When the state of the contact area direct fixation is formed by these means, the first sheet 62 and the wiring member 40 are in the state of the contact area direct fixation by these means. Specifically, when the state of the contact area direct fixation is formed by the ultrasonic fusion, for example, the first sheet 62 and the wiring member 40 are in the state of the contact area direct fixation by the ultrasonic fusion. It is applicable that a portion where the state of the contact area direct fixation by fusion is formed is referred to as a fusion part, and a fixing portion by ultrasonic fusion may be referred to as an ultrasonic fusion part, for example.

A fixing part FP1 (fusion part herein) between the first sheet 62 and the wiring member 40 may be continuously provided over a whole area along the longitudinal direction of the wiring member 40. The fixing part FP1 may be intermittently provided over a whole area along the longitudinal direction of the wiring member 40. That is to say, a plurality of spot fixing parts partially provided along the longitudinal direction of the wiring member 40 may be provided at intervals along the longitudinal direction of the wiring member 40. The same applies to a fixing part FP2 between the first sheet 62 and the second sheet 64.

The second sheet 64 has higher rigidity than the first sheet 62. It is sufficient that the second sheet 64 has higher rigidity than the wiring member 40. For example, it is applicable that the first sheet 62 is a sheet made of PVC to have a plastic property, and the second sheet 64 is a sheet made of PP to be hardly bended. The second sheet 64 is provided, thus the outer side regulation route portion 45 is hardly bended in any direction.

The plurality of (two herein) sheets 60 are provided at intervals along the longitudinal direction of the wiring member 40. The plurality of wiring members 40 are easily folded between the sheets 60. The plurality of wiring members 40 are held in parallel to each other on each sheet 60, thus the plurality of wiring members 40 are held in parallel to each other also between the sheets 60. Accordingly, two sheets 60 can be easily folded to be overlapped with each other. Herein, a portion of the electrical wire 41C between the outer side route regulation member 60 on a side of the connector C4 and the connector C4 is also the easy-bending part in the manner similar to the easy-bending part 47 in the connection route portion 46. Accordingly, the end portion of the electrical wire 41C can be easily routed when the connector C4 is connected to the connector C7.

A fixing part fixed to the door panel 20 is provided to the outer side regulation route portion 45. In the example illustrated in FIG. 5, the fixing part is an adhesive layer 66. The adhesive layer 66 is provided to the sheet 60. The adhesive layer 66 provided to the sheet 60 is bonded to the door panel 20 (herein, a surface of the outer panel 21 directed to the inner side of the vehicle), thus the outer side regulation route portion 45 is fixed to the door panel 20. Herein, the outer side regulation route portion 45 is fixed to a reinforcement member 28 provided to the inner side of the outer panel 21 in the door panel 20 via the adhesive layer 66. The adhesive layer 66 bonds the sheet 60 and the reinforcement member 28. The reinforcement member 28 is a member preventing the outer panel 21 from being concaved, for example. The reinforcement member 28 extends along the front-back direction of the door 10. For example, the reinforcement member 28 includes a leg part and a protruding part communicated with the leg part. The leg part is a portion welded to the outer panel 21. The protruding part extends away from the outer panel 21. The adhesive layer 66 is bonded to the protruding part. The adhesive layer 66 may be bonded to the leg part.

The adhesive layer 66 may be provided to a surface of the sheet 60 facing the wiring member 40 or a surface thereof on a side opposite to the surface thereof facing the wiring member 40. The adhesive layer 66 may be provided to the first sheet 62 or the second sheet 64 in the first sheet 62 and the second sheet 64. In the example illustrated in FIG. 5, the adhesive layer 66 is provided to a rear surface of the second sheet 64 in the first sheet 62 and the second sheet 64. When the door wiring module 30 is transported from a manufacturing plant of the door wiring module 30 to an assembly plant to be assembled to the door panel 20, it is sufficient that a release layer is provided to a surface of the adhesive layer 66. It is sufficient that the release layer is separated to bond the adhesive layer 66 to the door panel 20 in the assembly plant.

The present disclosure can be also deemed to be an assembling structure 1 of the door wiring module 30 including the door wiring module 30 and the door panel 20 to which the door wiring module 30 is assembled.

Effect Etc. of Embodiment 1

According to the door wiring module 30 having the above configuration and the assembling structure 1 thereof, the route of each of the inner side regulation route portion 44 and the outer side regulation route portion 45 can be regulated by the route regulation member. The easy-bending part 47 is provided to the connection route portion 46, thus the inner side regulation route portion 44 and the outer side regulation route portion 45 can be easily disposed in pre-determined assembling positions. Accordingly, assemblability of the door wiring module 30 including the outer side regulation route portion 45 and the inner side regulation route portion 44 can be improved.

More specifically, the inner side regulation route portion 44, the outer side regulation route portion 45, and the grommet G1, for example, are assumed as the portions fixed to the door panel 20 in the door wiring module 30. In these fixing operation, the fixing operation of the outer side regulation route portion 45 is normally performed prior to the fixing operation of the inner side regulation route portion 44 in the case of fixing the inner side regulation route portion 44 and the outer side regulation route portion 45. At this time, the easy-bending part 47 is located in the connection route portion 46 between the inner side regulation route portion 44 and the outer side regulation route portion 45, thus a base end portion of the outer side regulation route portion 45 on a side of the connection route portion 46 can be easily disposed in a fixing position. The route of the outer side regulation route portion 45 is regulated by the outer side route regulation member 60, thus when the base end portion of the outer side regulation route portion 45 on the side of the connection route portion 46 is disposed in the fixing position, a tip end portion thereof can be easily disposed in the fixing position. Accordingly, the outer side regulation route portion 45 can be easily fixed to the door panel 20.

When the grommet G1 is a type of passing through the side plate part 23 as with the present example, the fixing operation of the outer side regulation route portion 45 and the grommet G1 to the door panel 20 is performed through the service hole 26. At this time, the easy-bending part 47 is located between the branch part 48 and the outer side regulation route portion 45, thus when one of the outer side regulation route portion 45 and the grommet G1 is fixed to the door panel 20 prior to the other one of the outer side regulation route portion 45 and the grommet G1, the other one can be easily disposed to the fixing position.

When the branch part 48 is provided to a side of an end portion of the connection route portion 46 connected to the vehicle body apparatus, it is assumed that the electrical wire 41C wraps around the window housing part 27 from a front side of the door 10, and a length of the outer side regulation route portion 45 increases. The outer side regulation route portion 45 extends between the window housing part 27 and the outer panel 21, thus it is assumed to be difficult to perform the operation through the service hole 26. Even in this case, the route of the outer side regulation route portion 45 is regulated by the outer side route regulation member 60, and the easy-bending part 47 is provided to the connection route portion 46, thus assemblability of the outer side regulation route portion 45 can be improved.

The plurality of outer side route regulation members 60 are provided at intervals. Accordingly, the door wiring module 30 can be folded between the outer side route regulation members 60, thus even when the outer side regulation route portion 45 is long, a transportation state of the door wiring module 30 can be downsized.

The outer side route regulation member 60 is the sheet 60, and the plurality of wiring members 40 constituting the outer side regulation route portion 45 are held in a state of being arranged side by side on the sheet 60. Accordingly, the outer side regulation route portion 45 can be kept flat, thus the outer side regulation route portion 45 can be assembled to a narrow space in the door 10.

The sheet 60 includes the first sheet 62 to which the wiring member 40 is fused and the second sheet 64 having higher rigidity than the first sheet 62. Accordingly, the wiring member 40 can be fused and fixed to the sheet 60 while the route of the outer side regulation route portion 45 is regulated by the sheet 60.

The wiring member 40 are sandwiched between the first sheet 62 and the second sheet 64. Accordingly, both sides of the wiring member 40 can be protected by the sheet 60 in the outer side regulation route portion 45.

The adhesive layer 66 is provided to the sheet 60, thus the sheet 60 is bonded to the door panel 20 via the adhesive layer 66, and the outer side regulation route portion 45 can be fixed to the door panel 20.

Herein, the outer side regulation route portion 45 may be fixed to the door panel 20 by a clamp. When the outer side regulation route portion 45 is fixed to the door panel 20 by the clamp, a hole into which the clamp is inserted and locked needs to be made in the door panel 20. Such a hole is considered to be made in a protrusion part of the reinforcement member 28, for example. When the hole is made, rigidity of the reinforcement member 28 may decrease. In this case, a material having high rigidity is used for a material of the reinforcement member 28 or the reinforcement member 28 is formed to have a large size so that the rigidity lowered by the formation of the hole can satisfy rigidity necessary for the reinforcement member 28.

In contrast, in the door wiring module 30, the outer side regulation route portion 45 can be fixed to the door panel 20 via the adhesive layer 66, thus the hole into which the clamp is inserted needs not be made in the door panel 20, and reduction in rigidity of the door panel 20 can be suppressed. Accordingly, usage of a material having high rigidity for the material of the reinforcement member 28 and formation of the large reinforcement member 28 can be suppressed, thus increase in cost can be suppressed.

The inner side route regulation member 50 is the service hole cover 50 covering the service hole 26 formed in the inner panel 22. Accordingly, the service hole cover 50 and the inner side regulation route portion 44 can be assembled together, and assemblability of the inner side regulation route portion 44 can be improved.

Embodiment 2

Figure 6:
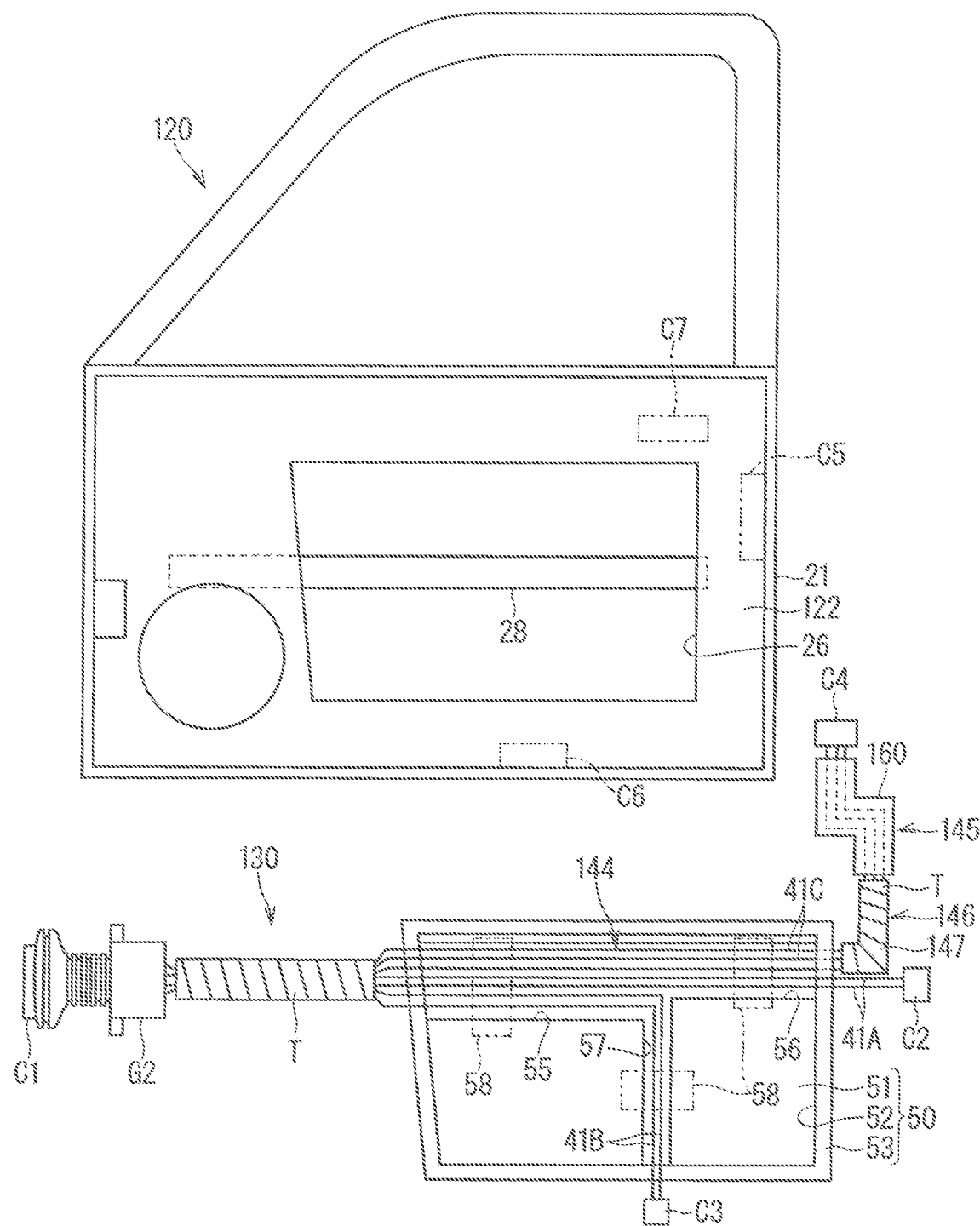
FIG. 6 is a front view illustrating a door wiring module according to an embodiment 2 and a door panel to which the door wiring module is assembled.
Figure 7:
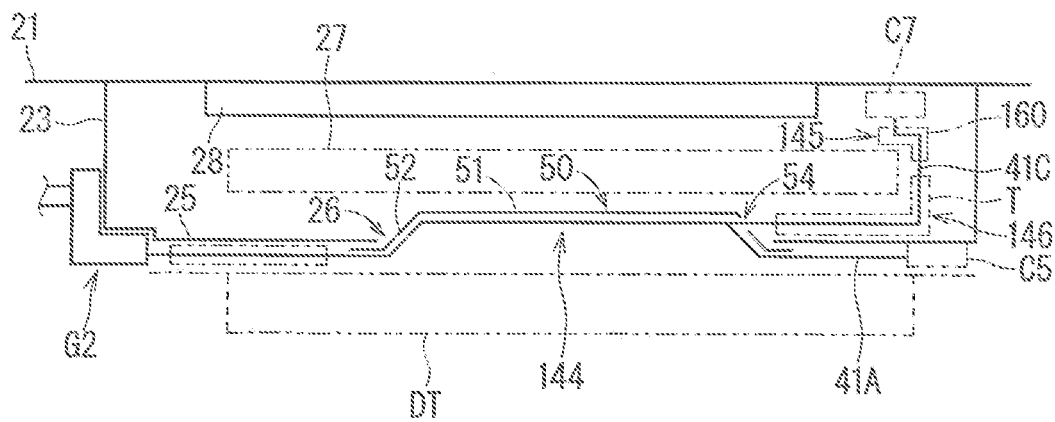
FIG. 7 is a schematic diagram of an assembling structure of the door wiring module.

A door wiring module according to an embodiment 2 is described. FIG. 6 is a front view illustrating a door wiring module 130 according to the embodiment 2 and a door panel 120 to which the door wiring module 130 is assembled. FIG. 7 is a schematic diagram of an assembling structure of the door wiring module. In the following description of the present embodiment, the same reference numerals are assigned to the similar constituent elements described above, and the description thereof will be omitted.

Routes of the plurality of wiring members 40 in the door wiring module 130 are different from those in the door wiring module 30 described above. Particularly, the electrical wire 41C for the outer handle wraps around the window housing part 27 from the back side of the door 10 to extend between the window housing part 27 and the outer panel 21. The electrical wire 41C for the outer handle constitutes an outer side regulation route portion 145 in one section. The electrical wire 41C for the outer handle constitutes a connection route portion 146 and an inner side regulation route portion 144 from one section toward a side of the vehicle body, that is to say, the other section in a midway portion extending toward the connector C1. Accordingly, the route of a part of a section can be regulated by the inner side route regulation member 50 in the electrical wire 41C constituting the outer side regulation route portion 145.

The electrical wire 41C for the outer handle warps around the window housing part 27 from the back side of the door panel 20 in at least one of the outer side regulation route portion 145 and/or the connection route portion 146. Accordingly, the route of the wiring member 40 wrapping around the window housing part 27 from the back side of the door panel 20 can be regulated by the outer side route regulation member 160. The state where the wiring member 40 wraps around the window housing part 27 indicates that the wiring member 40 goes from one of an inner panel 122 and the outer panel 21 toward the other one thereof in a space between the outer panel 21 and the inner panel 122 while being away from the window housing part 27.

The door wiring module 130 is different from the door wiring module 30 described above in that an outer side route regulation member 160 is a protector 160. The route of the electrical wire 41C for the outer handle is regulated by the protector 160 in the outer side regulation route portion 145. The electrical wire 41C for the outer handle is bundled by a banding member such as the adhesive tape T in the connection route portion 146 to be wholly an easy-bending part 147. It is also applicable that a part of the connection route portion 146 is the easy-bending part 147 and the other part thereof is not the easy-bending part 147. The other part may be provided with a member having higher rigidity than the easy-bending part 147, thereby being hardly bended, for example. The electrical wire 41C for the outer handle passes the inner panel 122 and the service hole cover 50 through the service hole 26 and the insertion hole 54 of the frame part 52. The electrical wire 41C for the outer handle is housed in the same grooves 55 and 56 as those of the electrical wire 41A for a door locking device in the inner side regulation route portion 144, for example.

A type of a grommet G2 in the door wiring module 130 is different from that of the grommet G1 in the door wiring module 30 described above. The grommet G2 is a so-called non-feed-through grommet which can be attached to a corner portion between the side plate part 23 and the main plate part 25 in the inner panel 122. In this case, the plurality of wiring members 40 are disposed closer to the inner side of the vehicle than the inner panel 122 over a whole area from the grommet G2 to the inner side regulation route portion 144. The electrical wire 41C for the outer handle is branched from the other electrical wires 41A and 41B on the inner panel 112, and passes through the service hole cover 50 and the inner panel 122 to extend to the portion between the outer panel 21 and the inner panel 122

The route of the electrical wire 41C for the outer handle may be a combination of the non-feed-through grommet G2 and the route wrapping around the window housing part 27 from the front side of the door 10. In this case, the electrical wire 41C passes through the service hole cover 50 and the inner panel 122 from the non-feed through grommet G2 in the manner similar to the door wiring module 130, and wraps around the window housing part 27 from the front side of the door 10 through the connection route portion 46 to extend between the window housing part 27 and the outer panel 21 in the manner similar to the door wiring module 30.

The route of the electrical wire 41C for the outer handle may be a combination of the feed-through grommet G and the route wrapping around the window housing part 27 from the back side of the door 10. In this case, the electrical wire 41C for the outer handle passes through the inner panel 22 and the service hole cover 50 from the feed-through grommet G1 in the manner similar to the door wiring module 30, and wraps around the window housing part 27 from the back side of the door 10 while passing through the inner panel 22 again in a midway portion going through the inner side regulation route portion 44 and the connection route portion 46 in the manner similar to the door wiring module 130 to extend between the window housing part 27 and the outer panel 21.

Modification Example

Figure 8:
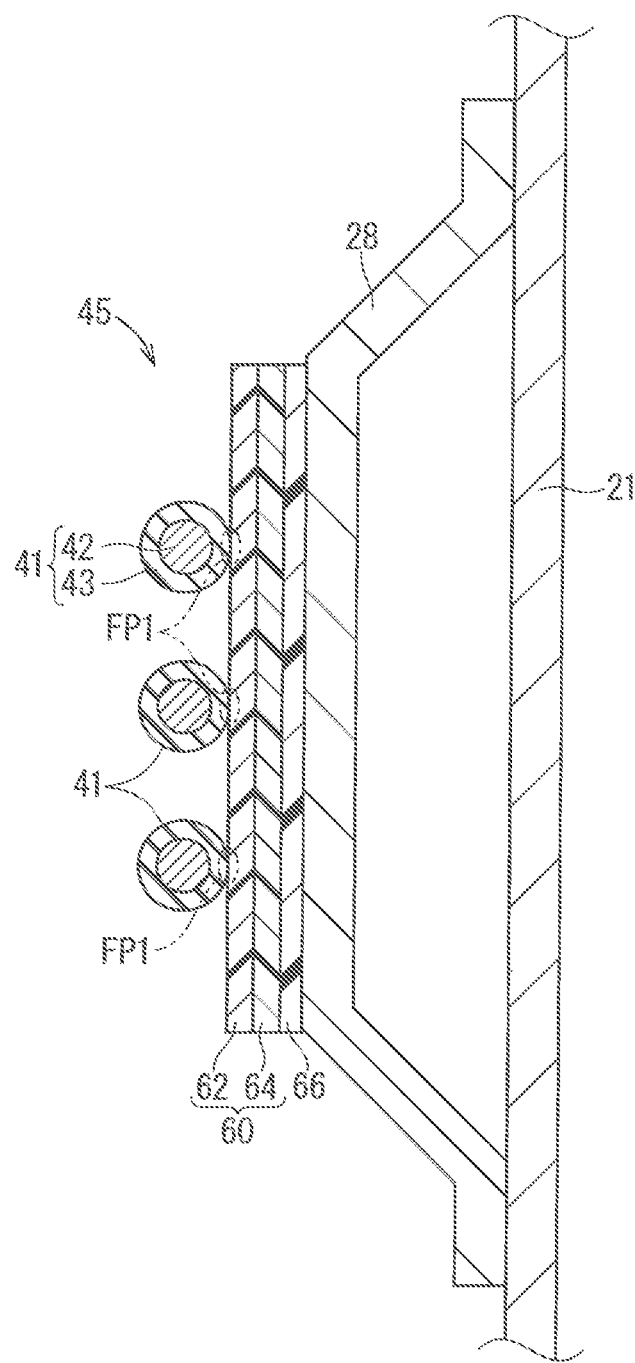
FIG. 8 is a transverse-sectional view illustrating a modification example of the outer side regulation route portion.

FIG. 8 is a transverse-sectional view illustrating a modification example of the outer side regulation route portion 45.

In the description of the embodiment 1, the first sheet 62 and the second sheet 64 sandwich the wiring member 40, however, this configuration is not necessary. As illustrated in FIG. 8, the second sheet 64 may be stacked on a surface of the first sheet 62 on a side opposite to a surface to which the wiring member 40 is fixed.

In the above description, the sheet 60 includes the first sheet 62 and the second sheet 64, however, this configuration is not necessary. The sheet 60 may not include one of the first sheet 62 and the second sheet 64. When the first sheet 62 is omitted, it is sufficient that the wiring member 40 is fixed to the second sheet 64 by the contact area fixation or the non-contact area fixation. When the second sheet 64 is omitted, there is a possibility that the sheet 60 is made up of only the first sheet 62 having a plastic property. Even in this case, the plurality of wiring members 40 are held to be arranged side by side on the first sheet 62, thus the outer side regulation route portion 45 is hardly bended in a direction parallel to the main surface of the sheet 60.

The configurations described in the embodiments and modification examples thereof can be appropriately combined as long as they are not contradictory.

EXPLANATION OF REFERENCE SIGNS 1 assembling structure of door wiring module
10 door
20, 120 door panel
21 outer panel
22, 122 inner panel
23 side plate part
24 through hole
25 main plate part
26 service hole
27 window housing part
28 reinforcement member
30, 130 door wiring module
40 wiring member
41, 41A, 42B, 42C electrical wire
42 core wire
43 covering layer
44, 144 inner side regulation route portion
45, 145 outer side regulation route portion
46, 146 connection route portion
47, 147 easy-bending part
48 branch part
50 service hole cover (inner side route regulation member)
51 cover body part
52 frame part
53 flange part
54 insertion hole
55, 56, 57 groove
58 wiring cover
60 sheet (outer side route regulation member)
62 first sheet
64 second sheet
66 adhesive layer
160 protector (outer side route regulation member)
C1, C2, C3, C4, C5, C6, C7 connector
DT design trim
G1, G2 grommet
FP1, FP2 fixing part
T adhesive tape
WP window glass
WR window regulator

The invention claimed is:

1. A door wiring module assembled to a vehicle door panel including an outer panel and an inner panel, comprising:
a plurality of wiring members connecting a vehicle body apparatus and a door apparatus; and
an inner side route regulation member and at least one outer side route regulation member regulating routes of the plurality of wiring members, wherein
the plurality of wiring members include: an outer side regulation route portion disposed between the outer panel and the inner panel so that a route of the outer side regulation route portion is regulated by the outer side route regulation member; an inner side regulation route portion disposed closer to an inner side of a vehicle interior than the outer side regulation route portion so that a route of the inner side regulation route portion is regulated by the inner side route regulation member; and a connection route portion as a portion connecting a portion between the inner side regulation route portion and the outer side regulation route portion, and
the connection route portion includes an easy-bending part bended more easily than the outer side regulation route portion.

2. The door wiring module according to claim 1, wherein
a branch part is provided to a side of an end portion of the connection route portion connected to the vehicle body apparatus,
a window housing part housing a window glass in a closed state is provided between the outer panel and the inner panel, and
the outer side regulation route portion extends between the window housing part and the outer panel.

3. The door wiring module according to claim 2, wherein
the plurality of outer side route regulation members are provided at intervals in a longitudinal direction of the wiring member.

4. The door wiring module according to claim 1, wherein
a wiring member constituting the outer side regulation route portion constitutes the connection route portion and the inner side regulation route portion in a midway portion from the outer side regulation route portion toward a side of a vehicle body.

5. The door wiring module according to claim 4, wherein
a window housing part housing a window glass in an open state is provided between the outer panel and the inner panel, and
the wiring member constituting the outer side regulation route portion wraps around the window housing part from a back side of the vehicle door panel in at least one of the connection route portion and/or the outer side regulation route portion.

6. The door wiring module according to claim 1, wherein
the outer side route regulation member is a sheet, and the plurality of wiring members constituting the outer side regulation route portion are held to be arranged side by side on the sheet.

7. The door wiring module according to claim 6, wherein
the sheet includes a first sheet and a second sheet having higher rigidity than the first sheet, and the wiring member is fixed to the first sheet by a contact area direct fixation.

8. The door wiring module according to claim 7, wherein
the wiring member is sandwiched between the first sheet and the second sheet.

9. The door wiring module according to claim 6, wherein
an adhesive layer is provided to the sheet.

10. The door wiring module according to claim 1, wherein
the inner side route regulation member is a service hole cover covering a service hole formed in the inner panel.

11. An assembling structure of a door wiring module, comprising:
the door wiring module according to claim 1, and
a door panel to which the door wiring module is assembled.

* * * * *